United States Patent
Maeda

(10) Patent No.: US 7,586,510 B2
(45) Date of Patent: Sep. 8, 2009

(54) IMAGE FORMING APPARATUS AND IMAGE DEVIATION CORRECTING METHOD

(75) Inventor: Katsuhiko Maeda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 242 days.

(21) Appl. No.: 11/334,592

(22) Filed: Jan. 19, 2006

(65) Prior Publication Data

US 2006/0176363 A1 Aug. 10, 2006

(30) Foreign Application Priority Data

Jan. 24, 2005 (JP) .............................. 2005-016150

(51) Int. Cl.
*B41J 2/435* (2006.01)
*B41J 2/47* (2006.01)
*G03G 15/01* (2006.01)

(52) U.S. Cl. .................. 347/232; 347/235; 347/240; 347/246; 399/301

(58) Field of Classification Search ............. 347/232, 347/235, 240, 246; 399/301
See application file for complete search history.

(56) References Cited

U.S. PATENT DOCUMENTS

| 5,787,321 | A  | * | 7/1998 | Nishikawa et al. .......... 399/69 |
| 6,070,041 | A  | * | 5/2000 | Nakayasu et al. .......... 399/301 |
| 6,236,827 | B1 | * | 5/2001 | Hada .......................... 399/301 |
| 6,360,070 | B1 | * | 3/2002 | Taka et al. ................... 399/301 |
| 6,831,672 | B2 |   | 12/2004 | Maeda |
| 6,833,856 | B2 |   | 12/2004 | Maeda |
| 6,847,390 | B2 |   | 1/2005 | Maeda |
| 6,853,392 | B2 |   | 2/2005 | Maeda |
| 2003/0001945 | A1 |   | 1/2003 | Maeda |
| 2004/0160506 | A1 | * | 8/2004 | Maeda ........................ 347/129 |
| 2004/0239747 | A1 |   | 12/2004 | Maeda |

FOREIGN PATENT DOCUMENTS

| JP | 8-146827 | 6/1996 |
| JP | 11-198435 | 7/1999 |
| JP | 2000-355122 | 12/2000 |
| JP | 2001-180043 | 7/2001 |

OTHER PUBLICATIONS

U.S. Appl. No. 11/552,675, filed Oct. 25, 2006, Kanzaki, et al.

* cited by examiner

*Primary Examiner*—Stephen D Meier
*Assistant Examiner*—Sarah Al-Hashimi
(74) *Attorney, Agent, or Firm*—Oblon, Spivak, McClelland, Maier & Neustadt, P.C.

(57) ABSTRACT

Image forming units each form an image of one color, which are superimposed to form a color image, and a pattern used for correcting deviation of the image. A first detector positioned at an image writing starting side, and a second and a third detector each detects the pattern. A first and a second correcting unit having different precisions correct a deviation of an image writing position based on detection by the first, second, and third detectors. A third and a fourth correcting unit having different precisions correct a total-width magnification error based on detections by the first and the third detectors. The fourth correcting unit further corrects a partial magnification error.

12 Claims, 19 Drawing Sheets

IMAGE FORMING APPARATUS AND IMAGE DEVIATION CORRECTING METHOD

CROSS-REFERENCE TO RELATED APPLICATIONS

The present document incorporates by reference the entire contents of Japanese priority document, 2005-016150 filed in Japan on Jan. 24, 2005.

BACKGROUND OF THE INVENTION

1. Field of the Invention

The present invention relates to a color image forming apparatus and an image deviation correcting method for correcting a deviation of an image writing position and a deviation of an image magnification.

2. Description of the Related Art

Color image forming apparatuses form a color image by superimposing respective colors, unlike the case of forming a monochrome image. When positions of the colors are deviated, colors of line images and characters are changed, and irregular colors are generated in the image, thereby deteriorating the image quality. Therefore, image positions of the colors need to be matched.

Image forming apparatuses that use a light beam scanning device modulate a light beam with image data, and rotate a polarizer (hereinafter, polygon mirror), thereby polarizing the light beam at an equal angular speed in a main scan direction. The image forming apparatus corrects the equal angular speed polarization to an equal speed polarization with an fθ lens, and scans the image on an image carrier (hereinafter, photoconductor).

However, in the conventional technology, image magnification differs for each machine due to variations in characteristics of the light beam scanning device (lens). Particularly, when a plastic lens is used, the shape and the refraction index of the plastic lens change due to a change in the ambient temperature, a change in the machine temperature, and the like. Consequently, a scan position on the image surface of the photoconductor changes, and a magnification error occurs in the main scan direction. As a result, a high-definition image cannot be obtained. In apparatuses that form a color image using plural laser beams and lenses, since color registration deviations occur due to magnification errors, a high-definition image cannot be obtained. Consequently, image magnifications of the colors need to be matched as much as possible.

Techniques of correcting position deviations in the main scan direction due to various factors such as a change in the ambient temperature and a change in the temperature within the image forming apparatus that forms color images using plural photoconductors, are disclosed in Japanese Patent Application Laid-Open Nos. H8-146827, H11-198435, and 2000-355122.

Japanese Patent Application Laid-Open No. H8-146827 discloses a relatively easy and highly precise technology for correcting the magnification of an image in the main scan direction and correcting distortions of other images relevant to the correction of the magnification. Specifically, frequencies of video clocks of colors are changed to obtain an equal interval between two points for each color, and an image writing start position and an image writing end position are corrected, thereby decreasing color registration deviations.

Japanese Patent Application Laid-Open No. H11-198435 discloses a technology for correcting a position deviation of an image formation position without complicating the configuration of the apparatus. Specifically, each time an image is scanned once with a light beam, a frequency controller changes the frequency of a clock signal by a width corresponding to a recording magnification of a part of an assigned image based on a frequency corresponding to a recording magnification of the whole assigned image, thereby correcting a deviation in the recording magnification of the total image and a partial variation in the recording magnification of the image.

Japanese Patent Application Laid-Open No. 2000-355122 discloses a technology for correcting a main scan magnification in high precision at low cost without increasing a frequency jitter of an image clock and substantially decreasing an image deviation at a part where a sub-pixel is added. Specifically, an image clock width corresponding to several pixels is increased or decreased in an image area, thereby matching the total image width in the main scan direction.

Regarding the color registration deviation in the main scan direction, it is necessary to match the writing start position, the writing end position, the total magnification, and the partial magnification for each color. Even one deviation (error) will lead to a color registration deviation. Therefore, the position and the magnification for each color need to be adjusted with high precision. For an apparatus that forms an image position deviation detecting pattern and detects and corrects a deviation among respective colors, it is preferable to carry out all corrections by a single operation, from the viewpoint of toner consumption and a printing speed. However, according to Japanese Patent Application Laid-Open Nos. H8-146827, H11-198435, and 2000-355122, the corrections cannot be carried out by a single operation. Furthermore, according to the method of variably controlling the frequency of the pixel clock and correcting the total magnification and the partial magnification while the light beam is scanning in the main scan direction, it is very difficult to obtain, especially at low cost, a stable frequency when a phase-locked loop (PLL) circuit is used.

SUMMARY OF THE INVENTION

It is an object of the present invention to at least solve the problems in the conventional technology.

According to an aspect of the present invention, an image forming apparatus includes a plurality of image forming units, each of which forms an image of one color and a correction pattern to be used for correcting position deviation of the image, wherein each image forming unit forms the image on an image formed by other image forming unit to form a color image, a plurality of detectors, each of which detects the correction pattern formed by a corresponding one of the image forming units, the detectors including a first detector that is positioned at an image writing starting side, a second detector, and a third detector, a first correcting unit and a second correcting unit that correct a deviation of an image writing position in a main scan direction based on a result of detection by the first detector, the first correcting unit and the second correcting unit having different correction precisions, and a third correcting unit and a fourth correcting unit that correct a total-width magnification error in the main scan direction based on results of detections by the second detector and the third detector, the third correcting unit and the fourth correcting unit having different correction precisions, wherein the fourth correcting unit further corrects a partial magnification error in the main scan direction.

According to another aspect of the present invention, a method includes forming a plurality of images of different colors and correction patterns to be used for correcting position deviation of a corresponding image, wherein each image is formed on another image to form a color image, detecting at least at three different locations each of the correction patterns formed at the forming, wherein the locations including a first location at an image writing starting side, a second location, and a third location, correcting with a first precision a deviation of an image writing position in a main scan direction based on a result of detection at the first location, and correcting with a second precision a deviation of an image writing position in a main scan direction based on a result of detection at the first location, and correcting at a third precision a total-width magnification error in the main scan direction based on results of detection at the second location and the third location, and correcting at a fourth precision a total-width magnification error in the main scan direction based on results of detection at the second location and the third location.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments of the present invention will be described below with reference to accompanying drawings. The present invention is not limited to these embodiments.

Figure 1:
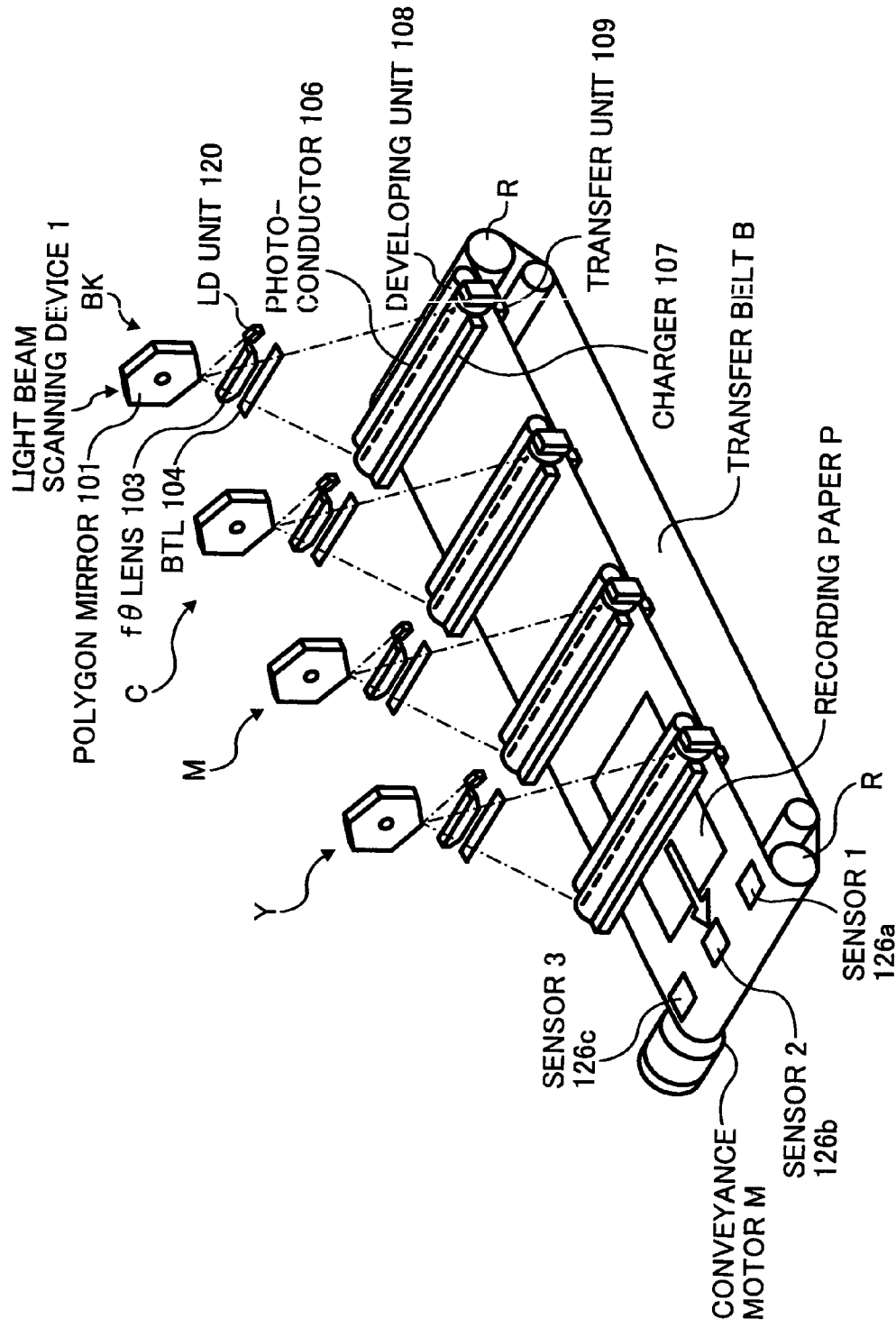
FIG. 1 a perspective of a four-drum type color image forming apparatus according to a first embodiment of the present invention.

FIG. 1 is a perspective of a four-drum type color image forming apparatus according to a first embodiment of the present invention. This image forming apparatus includes four sets of image forming units (a photoconductor, a developing unit, a charger, and a transfer unit) that form a color image having four-color images of yellow (Y), magenta (M), cyan (C), and black (BK) superimposed together, and four sets of light beam scanning devices. An image of a first color, followed by an image of a second color, an image of a third color, and an image of a fourth color are formed sequentially in this order onto recording paper P that is conveyed in an arrowhead direction by a transfer belt B, thereby forming a color image having the four-color images superimposed together, onto the recording paper P. A fixing device (not shown) fixes the image formed on the recording paper P.

Figure 2:
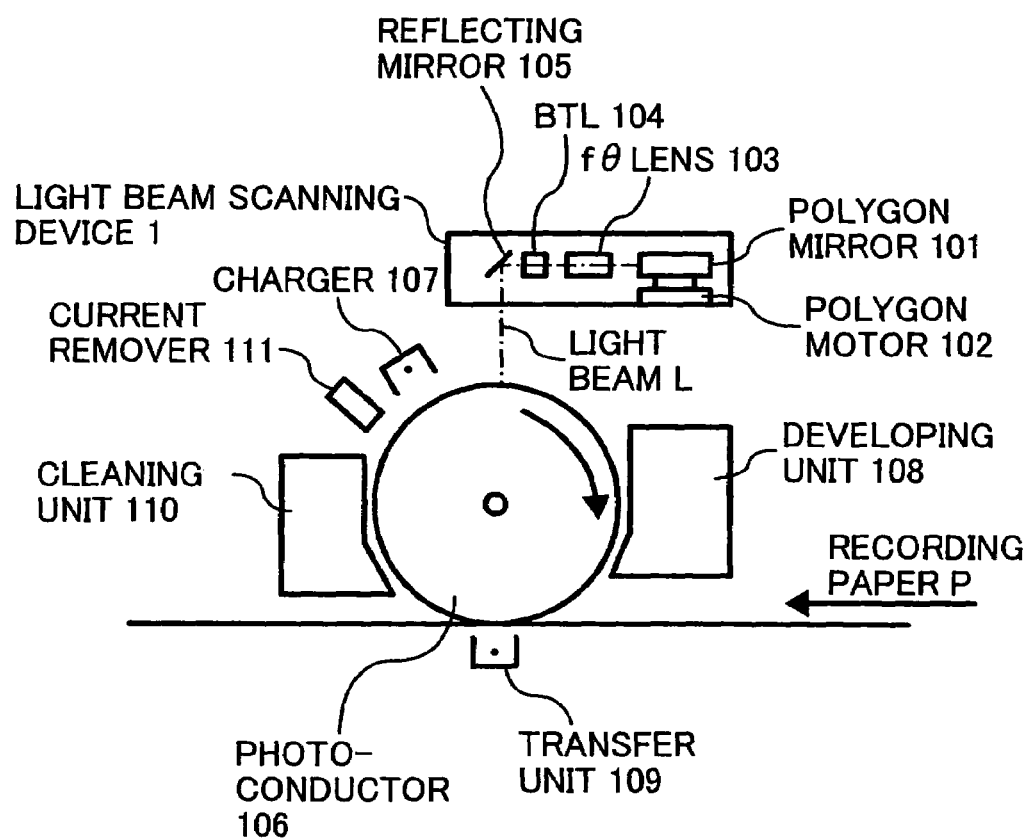
FIG. 2 is a side view of relevant parts of an image forming unit of one color in the image forming apparatus shown in FIG. 1.

FIG. 2 is a side view of relevant parts of an image forming unit of one color in the image forming apparatus shown in FIG. 1. In FIG. 2, a light beam scanning device 1 configured as an optical unit includes a laser diode (LD) that is lighted in accordance with image data, a collimator lens (not shown) that collimates a laser beam (a light beam) L emitted from the LD, a cylinder lens (not shown) that linearly connects between focal points in parallel with a sub-scan direction, a polygon mirror 101 into which light is incident from the cylinder lens and which polarizes the light, a polygon motor 102 that drives the polygon mirror 101 at a high speed, an fθ lens 103 that converts an equal angular speed scan into an equal speed scan, a barrel toroidal lens (BTL) 104, and a mirror 105. Based on this configuration, the collimator lens (not shown) collimates a light beam L emitted from the LD. The light beam L passes through the cylinder lens. The polygon mirror 101 rotated by the polygon motor 102 polarizes the light beam L. The polarized light beam L passes through the fθ lens 103 and the BTL 104. The reflecting mirror 105 reflects the light beam L, thereby scanning a photoconductor 106. The BTL focuses an image in a sub-scan direction, that is, the BTL achieves the focusing function and a positional correction in the sub-scan direction (cross-scan error compensation).

A charger 107, a developing unit 108, a transfer unit 109, a cleaning unit 110, and a current remover 111 are disposed around the photoconductor 106, thereby constituting an image forming unit. An image is formed on the recording paper P through a normal electro photographic process including charging, exposure, development, and transfer. A fixing device (not shown) fixes the image on the recording paper P.

According to the first embodiment, three sensors 126a, 126b, and 126c are provided further downstream of the last-stage image forming unit (BK in FIG. 1) in the transfer belt conveyance direction to detect an image-position deviation-correction pattern. These sensors detect the image-position deviation-correction pattern on the transfer belt B. Based on a result of the detection by the sensor 126a, the image position can be corrected. Based on a result of the detections by the sensor 126a and the sensor 126b, the image magnification of the left half of the image can be corrected. Based on a result of the detections by the sensor 126b and the sensor 126c, the image magnification of the right half of the image can be corrected. Based on a result of the detections by the sensor 126a and the sensor 126c, the image magnification of the total width can be corrected.

Figure 3:
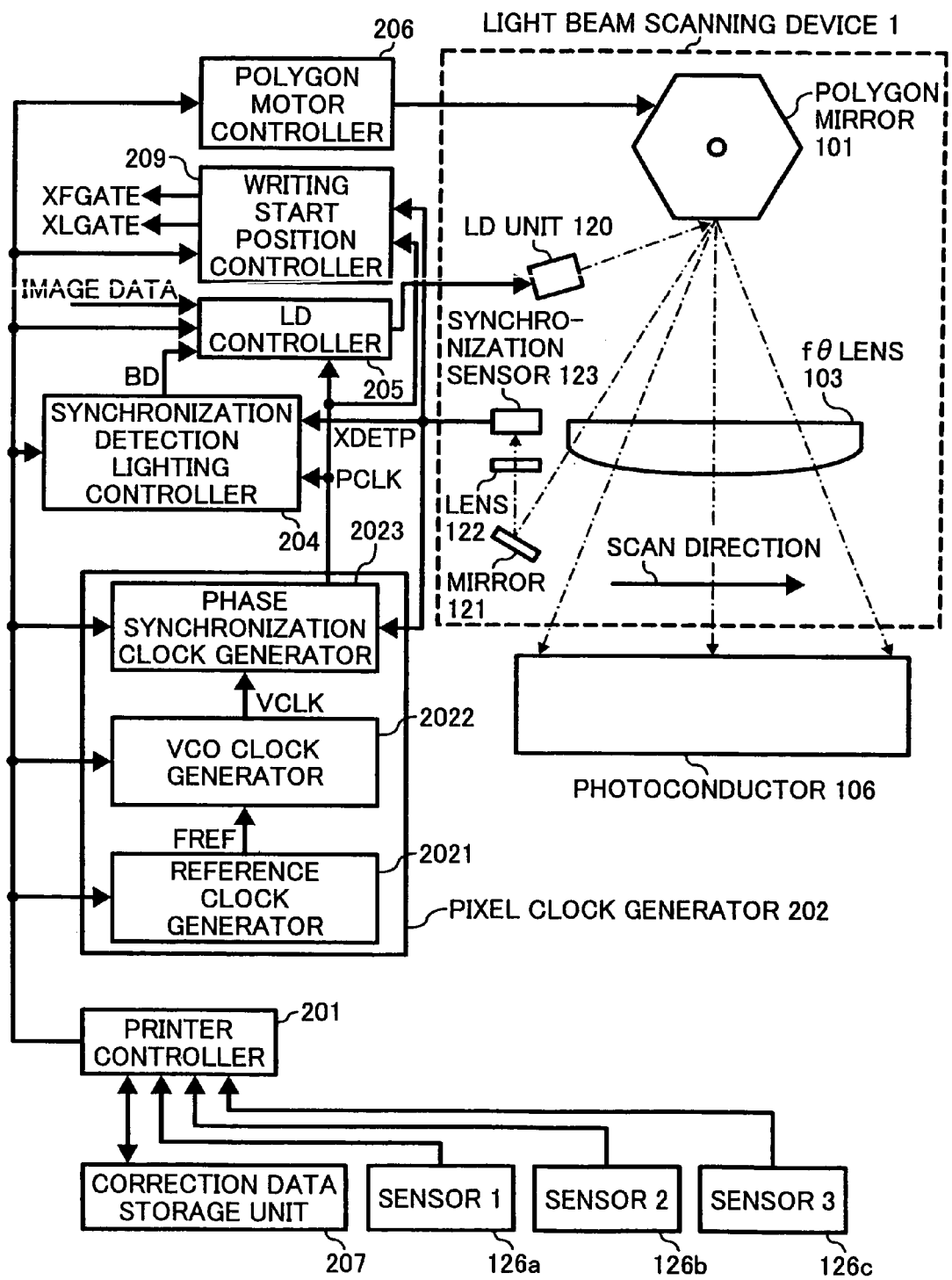
FIG. 3 is a schematic of a light beam scanning device, an image forming controller, and an optical unit in the image forming apparatus shown in FIG. 1.

FIG. 3 is a schematic of the light beam scanning device, an image forming controller, and the optical unit in the image forming apparatus. FIG. 3 includes a top plan view of the light beam scanning device 1, added with a peripheral control system. The control system includes a printer controller 201, a pixel clock generator 202, a synchronization detection lighting controller 204, an LD controller 205, a polygon motor controller 206, a correction data storage unit 207, and a writing start position controller 209. A synchronization sensor 123 that detects the light beam L at the scan starting side in the main scan direction of the light beam scanning device 1 is also provided. A mirror 121 reflects the light beam L that is emitted from an LD unit 120, reflected by the polygon mirror 101, and has passed through the fθ lens 103. The light beam L is focused by a lens 122, and is incident to the synchronization sensor 123.

When the light beam L passes through the synchronization sensor 123, the synchronization sensor 123 outputs a synchronization detection signal XDETP, and transmits this signal to the pixel clock generator 202, the synchronization detection lighting controller 204, and the writing start position controller 209.

The pixel clock generator 202 generates the pixel clock PCLK synchronous with the synchronization detection signal XDETP, and transmits the pixel clock PCLK to the LD controller 205 and the synchronization detection lighting controller 204. The pixel clock generator 202 includes a reference clock generator 2021, a voltage controlled oscillator (VCO) clock generator 2022, and a phase synchronization clock generator 2023.

Figure 4:
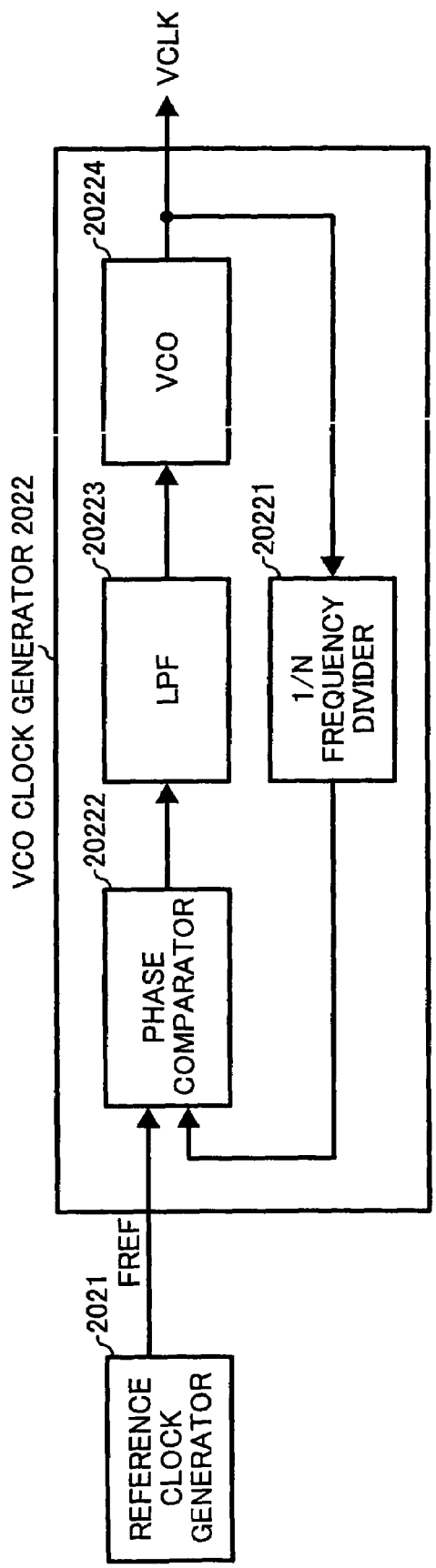
FIG. 4 is a detailed block diagram of a voltage controlled oscillator (VCO) clock generator shown in FIG. 3.

FIG. 4 is a detailed block diagram of the VCO clock generator (a phase-locked loop (PLL) circuit) 2022. The VCO clock generator 2022 inputs a reference clock signal FREF received from the reference clock generator 2021, and a signal obtained by frequency-dividing the VCLK by N with a 1/N frequency divider 20221, to a phase comparator 20222. The phase comparator 20222 compares the phase of both signals at the falling edge of the signals, and outputs an error component by a constant current. A low-pass filter (LPF) 20223 removes unnecessary high-frequency components and noise, and transmits the result of the signal to a VCO 20224. The VCO 20224 outputs an oscillation frequency that depends on the output of the LPF 20223. Therefore, when the printer controller 201 changes the frequency and the frequency dividing ratio N of the FREF, the frequency of the VCLK can be changed.

The phase synchronization clock generator 2023 generates the pixel clock PCLK from the VCLK that is set to eight times the pixel clock frequency, and further generates the pixel clock PCLK synchronous with the synchronization detection signal XDETP. Based on correction data from the printer controller 201, the phase synchronization clock generator 2023 advances or delays the phase of the rising of the PCLK by a half cycle of the VCLK.

The synchronization detection lighting controller 204 first forcibly lights the LD by turning on an LD forced-lighting signal BD, to detect the synchronization detection signal XDETP. After detecting the synchronization detection signal XDETP, the synchronization detection lighting controller 204 turns on the LD at a timing when the synchronization detection signal XDETP can be securely detected without generating a flare light, by the synchronization detection signal XDETP and the pixel clock PCLK. After detecting the synchronization detection signal XDETP, the synchronization detection lighting controller 204 generates the LD forced-lighting signal BD for turning off the LD, and transmits the LD forced-lighting signal BD to the LD controller 205.

The LD controller 205 controls the lighting of the LD according to the image data synchronous with the synchronization detection forced-lighting signal BD and the pixel clock PCLK. The LD controller 205 emits the laser beam L from the LD unit 120. The polygon mirror 101 polarizes the laser beam L. The laser beam L passes through the fθ lens 103, and scans the photoconductor 106.

The polygon motor controller 206 controls the polygon motor 102 at a prescribed number of rotations based on a control signal from the printer controller 201.

The writing start position controller 209 generates a main scan gate signal XLGATE and a sub-scan gate signal XFGATE for determining the image writing start timing and the image width, based on the synchronization detection signal XDETP, the pixel clock PCLK, the control signal, and the like from the printer controller 201.

The sensors 126a, 126b, and 126c that detect the image-position deviation-correction pattern detect and transmit image pattern information to the printer controller. The printer controller calculates a position deviation, generates correction data, and stores the correction data into the correction data storage unit.

The correction data storage unit 207 stores correction data for correcting the image position deviation and the magnification deviation, that is, data for determining the timing of the XLGATE and XFGATE signals, data for determining the frequency of the pixel clock PCLK, and a quantity for changing the cycle (phase) of the pixel clock PLCK and its direction (whether to increase or decrease the cycle, and whether to delay or advance the cycle). Based on an instruction from the printer controller 201, the correction data is set to each controller.

Figure 5:
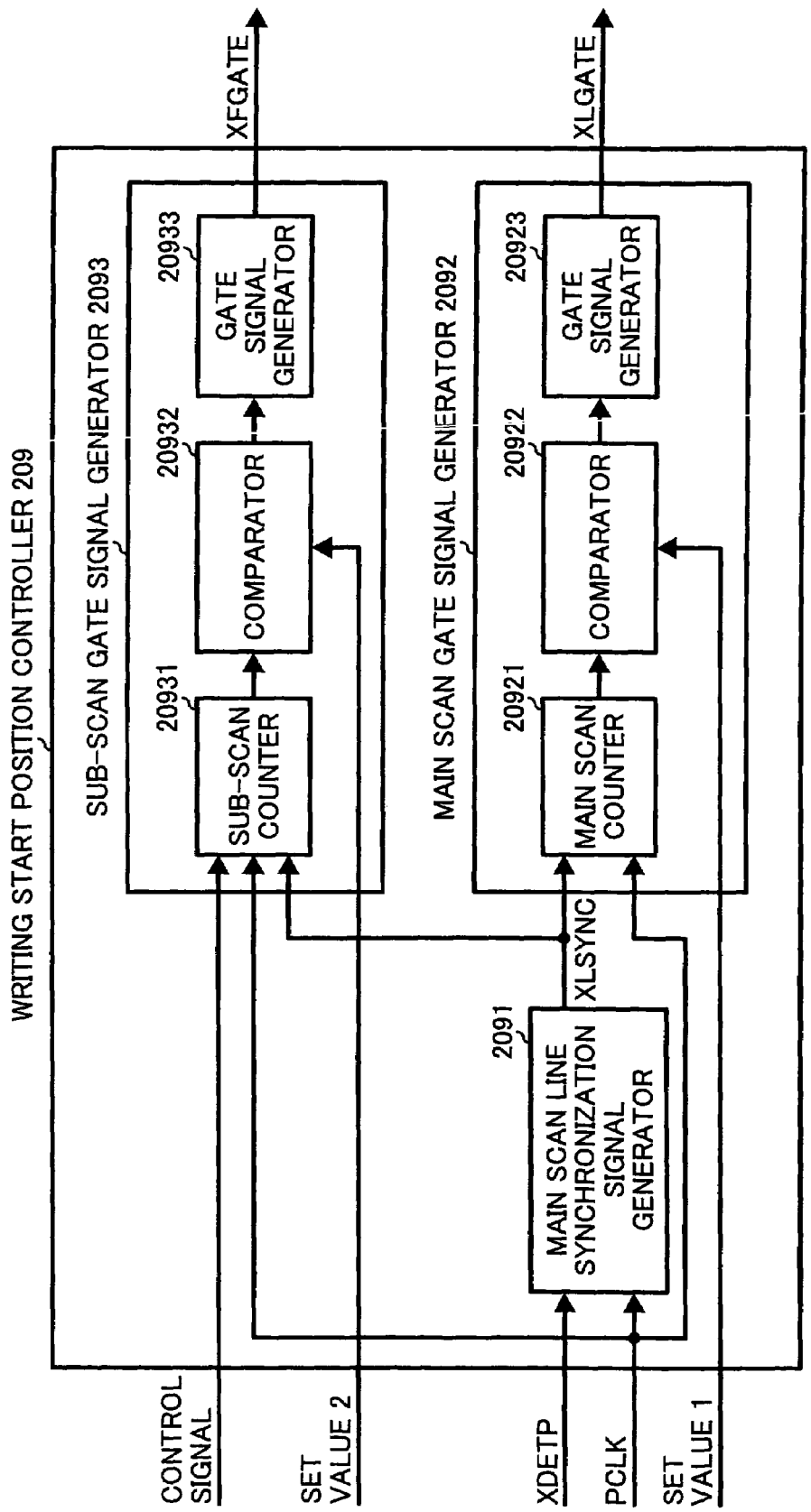
FIG. 5 is a detailed block diagram of a writing start position controller shown in FIG. 3.

FIG. 5 is a detailed block diagram of the writing start position controller 209. The writing start position controller 209 includes a main scan line synchronization signal generator 2091, a main scan gate signal generator 2092, and a sub-scan gate signal generator 2093. The main scan gate signal generator 2092 includes a main scan counter 20921, a comparator 20922, and a main scan gate signal generator 20923. The sub-scan gate signal generator 2093 includes a sub-scan counter 20931, a comparator 20932, and a sub-scan gate signal generator 20933.

The main scan line synchronization signal generator 2091 generates a signal XLSYNC for operating the main scan counter 20921 within the main scan gate signal generator 2092, and the sub-scan counter 20931 within the sub-scan gate signal generator 2093. The main scan gate signal generator 2092 generates the XLGATE signal for determining the fetch timing of the image signal (the image writing timing in the main scan direction). The sub-scan gate signal generator 2093 generates the XFGATE signal for determining the fetch timing of the image signal (the image writing timing in the sub-scan direction).

The main scan gate signal generator 2092 includes the main scan counter 20921 that operates based on the XLSYNC and the pixel clock PCLK, the comparator 20922 that compares a counter value with correction data (1) from the printer controller, and outputs a result of the comparison, and the main scan gate signal generator 20923 that generates the XLGATE based on the comparison result from the comparator 20922.

The sub-scan gate signal generator 2093 includes the sub-scan counter 20931 that operates based on the control signal from the printer controller 201, the XLSYNC, and the pixel clock PCLK, the comparator 20932 that compares a counter value with correction data (2) from the printer controller 201, and outputs a result of the comparison, and the sub-scan gate signal generator 20933 that generates the XFGATE based on the comparison result from the comparator 20932.

The writing start position controller 209 can correct the writing position in one cycle unit of the pixel clock PCLK, that is, one dot unit, for the main scan, and can correct the writing position in one cycle unit of the XLSYNC, that is, one line unit, for the sub-scan. In the main scan direction, the writing position can be corrected by changing the cycle of the pixel clock PLCK during a period from the synchronization detection signal XDETP to the image writing start position. The correction data for the main scan and the sub-scan are stored in the correction data storage unit 207.

Figure 6:
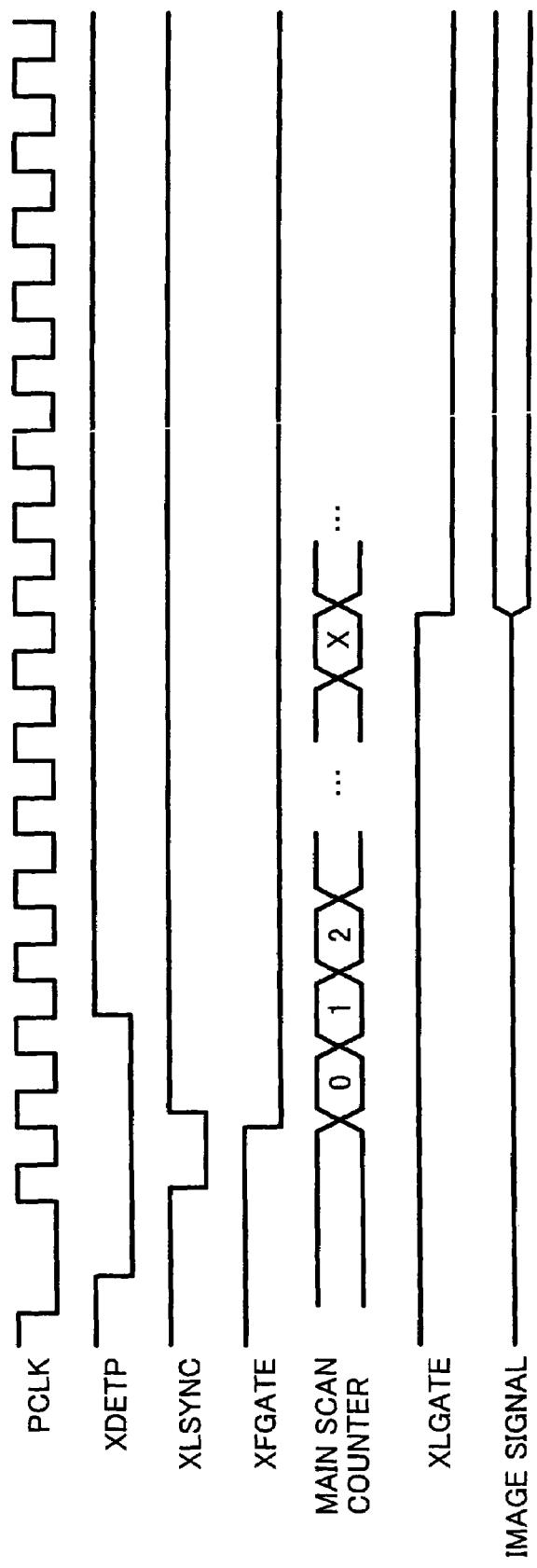
FIG. 6 is a timing chart of an output timing of a signal of the writing start position controller shown in FIG. 3.

FIG. 6 is a timing chart of the output timing of a signal of the writing start position controller 209. As shown in FIG. 6, the writing start position controller 209 resets the counter based on the XLSYNC, and counts up the counter value based on the PCLK. When the counter value reaches a set value 1 set by the printer controller 201 (in this case, X), the comparator 20922 outputs a result of the comparison. The gate signal generator 20923 sets the XLGATE to L (valid). The XLGATE is the signal that becomes L by the image width in the main scan direction. In the sub-scan direction, the count up is carried out based on the XLSYNC, and the equivalent operation is carried out.

Figure 7:
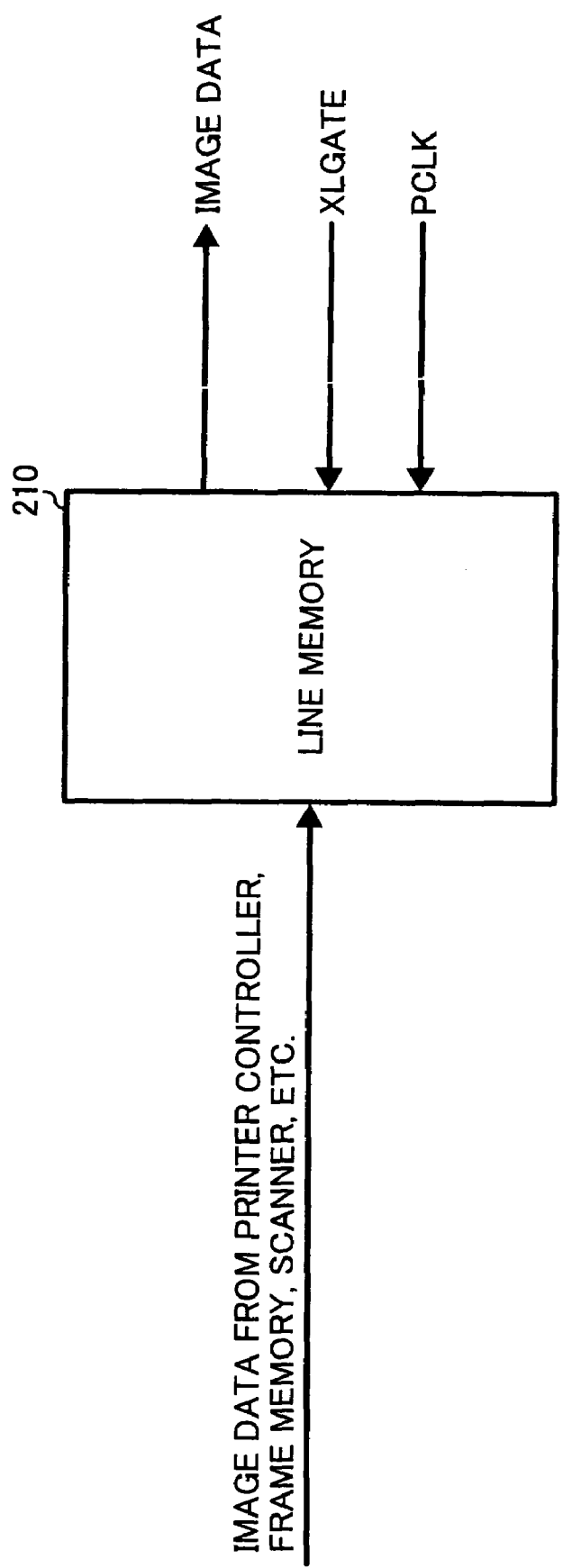
FIG. 7 is a block diagram of a first-stage of the image forming controller shown in FIG. 4.

FIG. 7 is block diagram of a first-stage of the image forming controller. A line memory 210 is provided at the first-stage. The image data fetched from the printer controller, a frame memory, a scanner, or the like at the timing of the XFGATE is output as an image signal, by synchronizing the XLGATE with the PCLK by the section of L. The output image data (image signal) is transmitted to the LD controller 205, and the LD is turned on at this timing.

Figure 8:
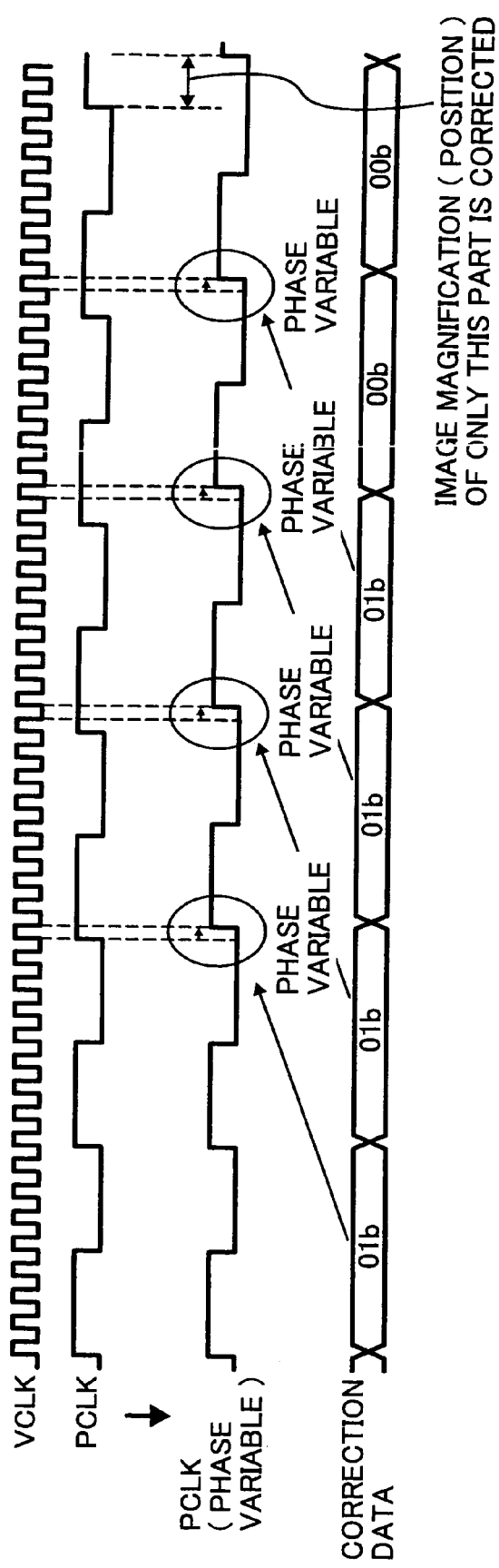
FIG. 8 is a timing chart of an output timing of a pixel clock.

FIG. 8 is a timing chart of the output timing of the pixel clock PCLK. In the correction data from the printer controller 201, 00b indicates that there is no correction, 01b indicates that the cycle is increased (the phase is delayed) by 1/16 PCLK, and 10b indicates that the cycle is decreased (the phase is advanced) by 1/16 PCLK. The correction data is transmitted synchronously with the pixel clock PCLK, and is reflected to the rising edge of the next PCLK. When the correction data is 00b, the cycle of the PCLK becomes eight times that of the VCLK. When the correction data is 01b, the phase of the rising edge of the PCLK is delayed by a half cycle of the VCLK, that is, by 1/16 PCLK. Thereafter, the phase is delayed by 1/16 PCLK from the original PCLK. In FIG. 8, the cycle is changed (the phase is shifted) four times. Therefore, the phase of the PCLK is delayed by 4/16 PCLK in total. In other words, the image magnification and the image position are corrected by 4/16 PCLK.

Figure 9:
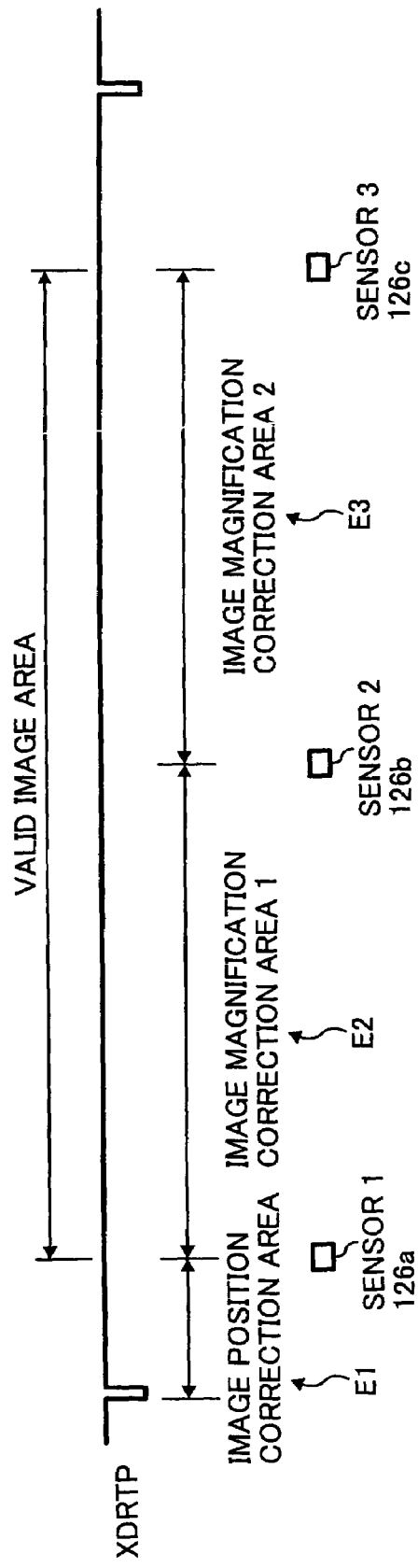
FIG. 9 is a schematic for explaining a relationship between a sensor position and an area to be corrected.

FIG. 9 is a schematic for explaining a relationship between a sensor position and an area to be corrected. According to the first embodiment, the sensor 126a is set to an image end part at the scan starting side, the sensor 126b is set to the center of the image, and the sensor 126c is set to an image end part at the scan ending side. As shown in FIG. 8, the image position can be corrected by changing the cycle (phase) of the pixel clock. Furthermore, the magnification of a part of the image can be corrected. At the time of shifting the total image position at a fast rate or a slow rate, the cycle (phase) of the pixel clock PCLK before the actual image (at the scan starting side) needs to be changed. A part from the synchronization detection signal XDETP as the writing starting reference signal in the main scan direction to the image writing position is the area to be corrected, that is, an image position correction area E1. In this area, the cycle (phase) of the pixel clock PCLK is changed by using the correction data stored in the correction data storage unit 207.

On the other hand, at the time of correcting the image magnification, the cycle (phase) of the pixel clock needs to be changed and corrected within the image area in which an error of the image magnification actually occurs. For the error of a partial magnification of an image magnification correction area (1) E2 between the sensor 126a and the sensor 126b, the cycle (phase) of the pixel clock of the correction area (1) E2 is changed using the correction data stored in the correction data storage unit 207. For the error of a partial magnification of an image magnification correction area (2) E3 between the sensor 126b and the sensor 126c, the cycle (phase) of the pixel clock PCLK of the correction area (2) E3 is changed using the correction data stored in the correction data storage unit 207. For the error of the total magnification of the area between the sensor 126a and the sensor 126c, the cycles (the phases) of the pixel clocks of the correction area (1) E2 and the correction area (2) E3 are changed using the correction data stored in the correction data controller 207.

Figure 10:
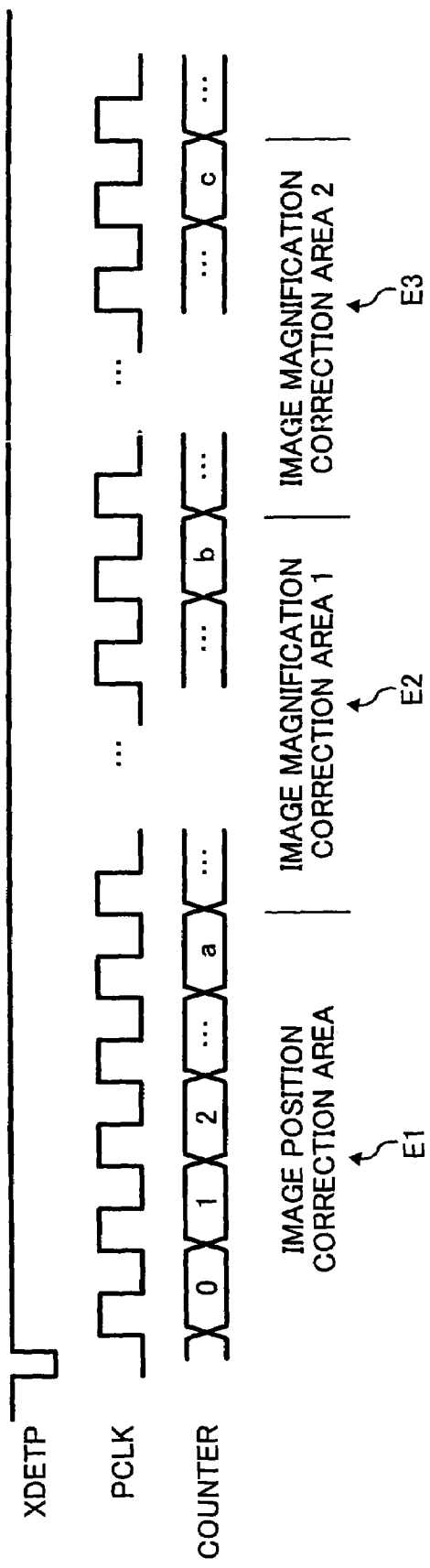
FIG. 10 is a schematic for explaining a method of setting a correction area.

FIG. 10 is a schematic of a method of setting a correction area. According to the first embodiment, the correction area is determined based on the value of the main scan counter 20921 that operates according to the synchronization detection signal XDETP and the pixel clock PCLK. For example, as shown in FIG. 10, when set values of boundaries in the respective areas are set as a, b, and c, the area of counter values from 0 to a is the image position correction area E1, the area of counter values from a+1 to b is the image magnification correction area (1) E2, and the area of counter values from b+1 to c is the image magnification correction area (2) E3. Based on this, the cycle (phase) of the pixel clock of each area is variably controlled.

The area set values a, b, and c are set based on a distance from the synchronization sensor 123. In other words, since one cycle of the pixel clock PCLK is one dot and since a distance from the synchronization sensor 123 to each of the sensors 126a, 126b, and 126c can be known at the time of installing the device, the number of dots corresponding to this distance is set. When one dot is 600 dots per inch, one cycle of the PCLK corresponds to 42.3 micrometers.

Figure 11:
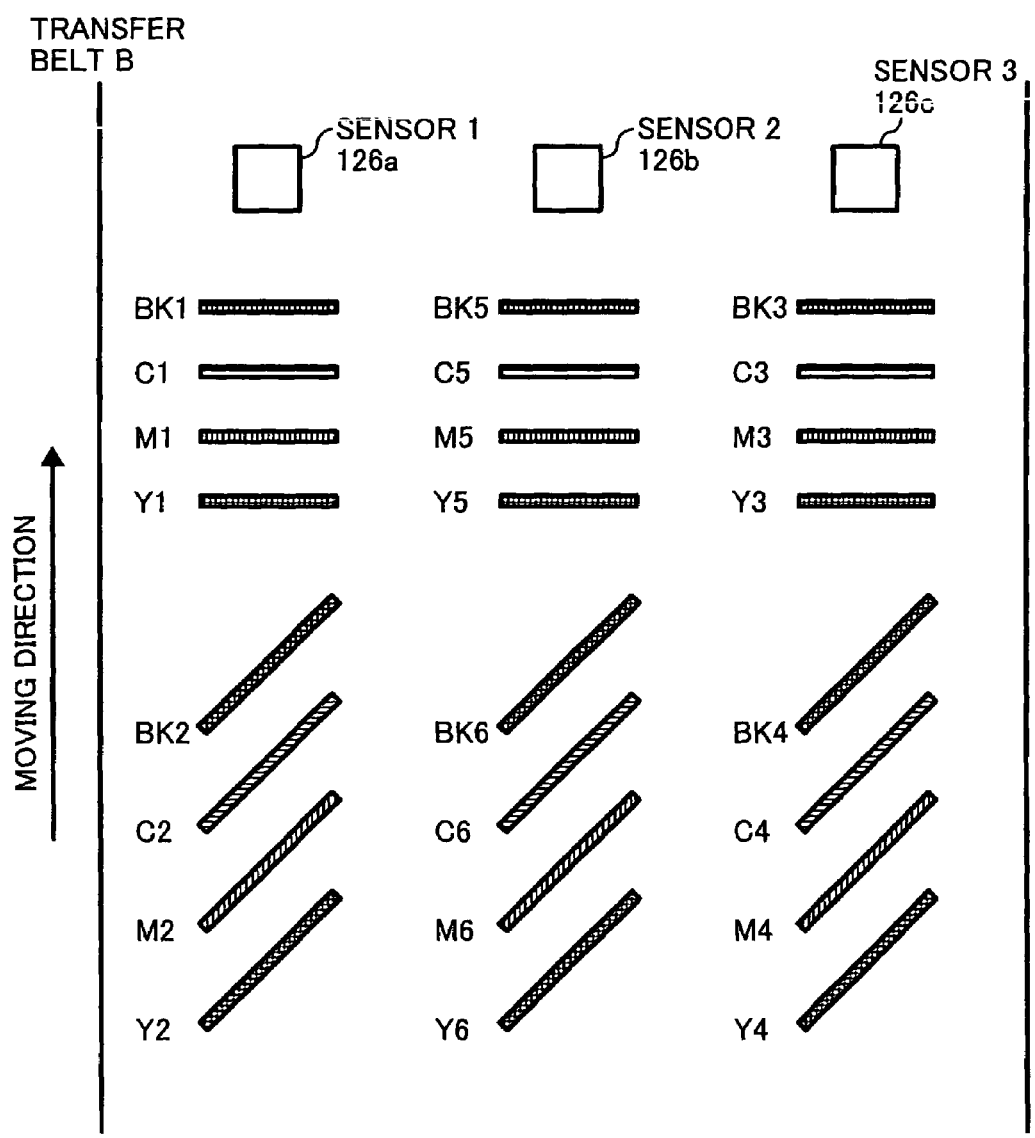
FIG. 11 depicts image-position deviation-correction patterns that are formed on a transfer belt.

FIG. 11 depicts image-position deviation-correction patterns that are formed on the transfer belt B. Lateral lines and hatched lines are formed on the transfer belt B at timings set for respective colors in advance. When the transfer belt B moves in the direction of an arrowhead, the sensor 126a, the sensor 126b, and the sensor 126c detect lateral lines of respective colors BK1, C1, M1, Y1, BK5, C5, M5, Y5, BK3, C3, M3, and Y3, and hatched lines of respective colors BK2, C2, M2, Y2, BK6, C6, M6, Y6, BK4, C4, M4, and Y4, respectively. The detected information is transmitted to the printer controller 201. The printer controller 201 calculates a deviation (time) of each color from BK. Detection timings of the hatched lines BK2, C2, M2, Y2, BK6, C6, M6, Y6, BK4, C4, M4, and Y4 change due to deviations of the image position in the main scan direction and deviations in the image magnification. Detection timings of the lateral lines BK1, C1, M1, Y1, BK5, C5, M5, Y5, BK3, C3, M3, and Y3 change due to deviations of the image position in the sub-scan direction.

Specifically, for the image position in the main scan direction, the time from a pattern C1 to a pattern C2 is compared with the time with a pattern BK1 to a pattern BK2 as a reference time. A time difference TBKC12 becomes an image deviation of a cyan image from a black image. Any one of the timing of the XLGATE signal that determines the writing start timing and the cycle (phase) of the image clock PCLK, or both is changed corresponding to the image deviation. This is similarly applied to magenta and yellow.

For the total width image magnification in the main scan direction, the time from the pattern C1 to the pattern C2 is compared with the time from the pattern BK1 to the pattern BK2 as a reference time, thereby obtaining a deviation TBKC12. Furthermore, the time from a pattern C3 to a pattern C4 is compared with the time from a pattern BK3 to a pattern BK4 as a reference time, thereby obtaining a deviation TBKC34.

TBKC34−TBKC12 becomes a magnification error of the total width cyan image from the black image. The frequency of the pixel clock PCLK and the cycle (phase) of the pixel clock PCLK are changed corresponding to the magnification error.

For the image magnification of the left half of the image in the main scan direction, the time from the pattern C1 to the pattern C2 is compared with the time from the pattern BK1 to the pattern BK2 as a reference time, thereby obtaining the deviation TBKC12. Furthermore, the time from a pattern C5 to a pattern C6 is compared with the time from a pattern BK5 to a pattern BK6 as a reference time, thereby obtaining a deviation TBKC56.

TBKC56−TBKC12 becomes a magnification error of the left half cyan image from the black image. The cycle (phase) of the pixel clock PCLK is changed corresponding to the magnification error.

For the image magnification of the right half of the image in the main scan direction, the time from the pattern C5 to the pattern C6 is compared with the time from the pattern BK5 to the pattern BK6 as a reference time, thereby obtaining the deviation TBKC56. Furthermore, the time from the pattern C3 to the pattern C4 is compared with the time from the pattern BK3 to the pattern BK4 as a reference time, thereby obtaining a deviation TBKC34.

TBKC34−TBKC56 becomes a magnification error of the right half cyan image from the black image. The cycle (phase) of the pixel clock PCLK is changed corresponding to the magnification error. This is similarly applied to magenta and yellow.

For the sub-scan direction, a time difference of a lateral line of each color from a lateral line of BK is compared with a reference value (a target time difference), thereby obtaining a time deviation. The timing of the XFGATE signal for determining the writing start timing is changed by the time deviation. In the first embodiment, time deviation is detected at three positions. Therefore, it is preferable to use an average value of the deviations detected at the three positions.

Figure 12:
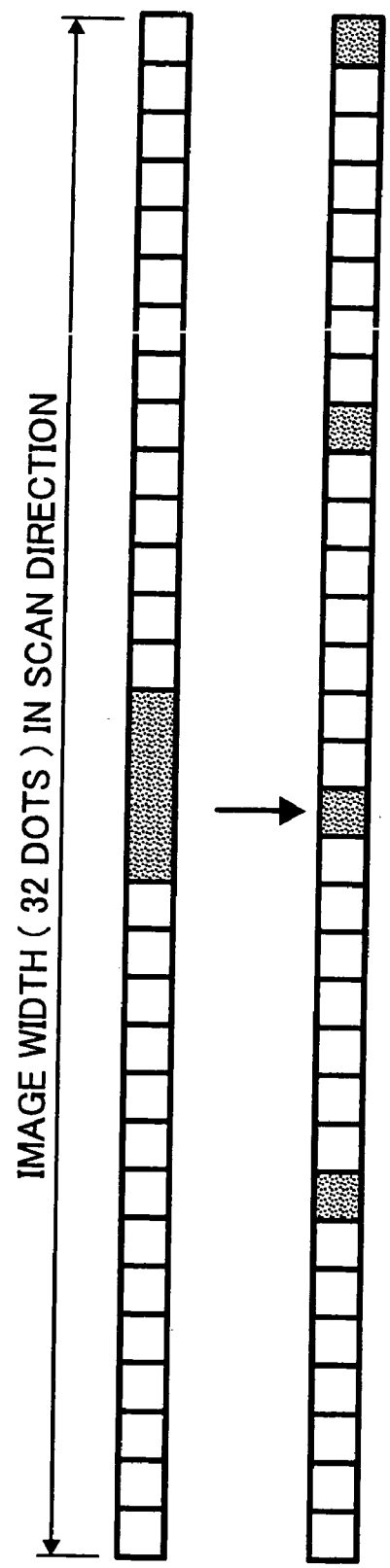
FIG. 12 is an explanatory diagram of pixels of which phases of the pixel clock are to be shifted in the main scan direction.

FIG. 12 is an explanatory diagram of pixels of which phases of the pixel clock PCLK are to be shifted in the main scan direction. Assume that the image width (area width) in the main scan direction is 32 dots and that the phase is corrected by 4/16 PCLK. When the phases of pixels shift continuously in the image position correction area E1, there is no problem because this area is not the area into which image data is actually written. However, when the phases of four pixels shift continuously in the image magnification correction areas E2 and E3, the images in these areas are locally expanded or contracted. Therefore, pixels of which phases shift in an eight-dot cycle are inserted into these image magnification correction areas E2 and E3, based on the following expression:

Cycle of pixels of which phases are to be shift=area width/number of pixels of which phases shift=32/4=8.

With this arrangement, pixels of which phases are to be shifted can be uniformly arranged within the image magnification correction areas E2 and E3. The expression for calculating the cycle is not particularly limited to this. An expression that can calculate the cycle for scattering the pixels within the image area is sufficient.

Figure 13:
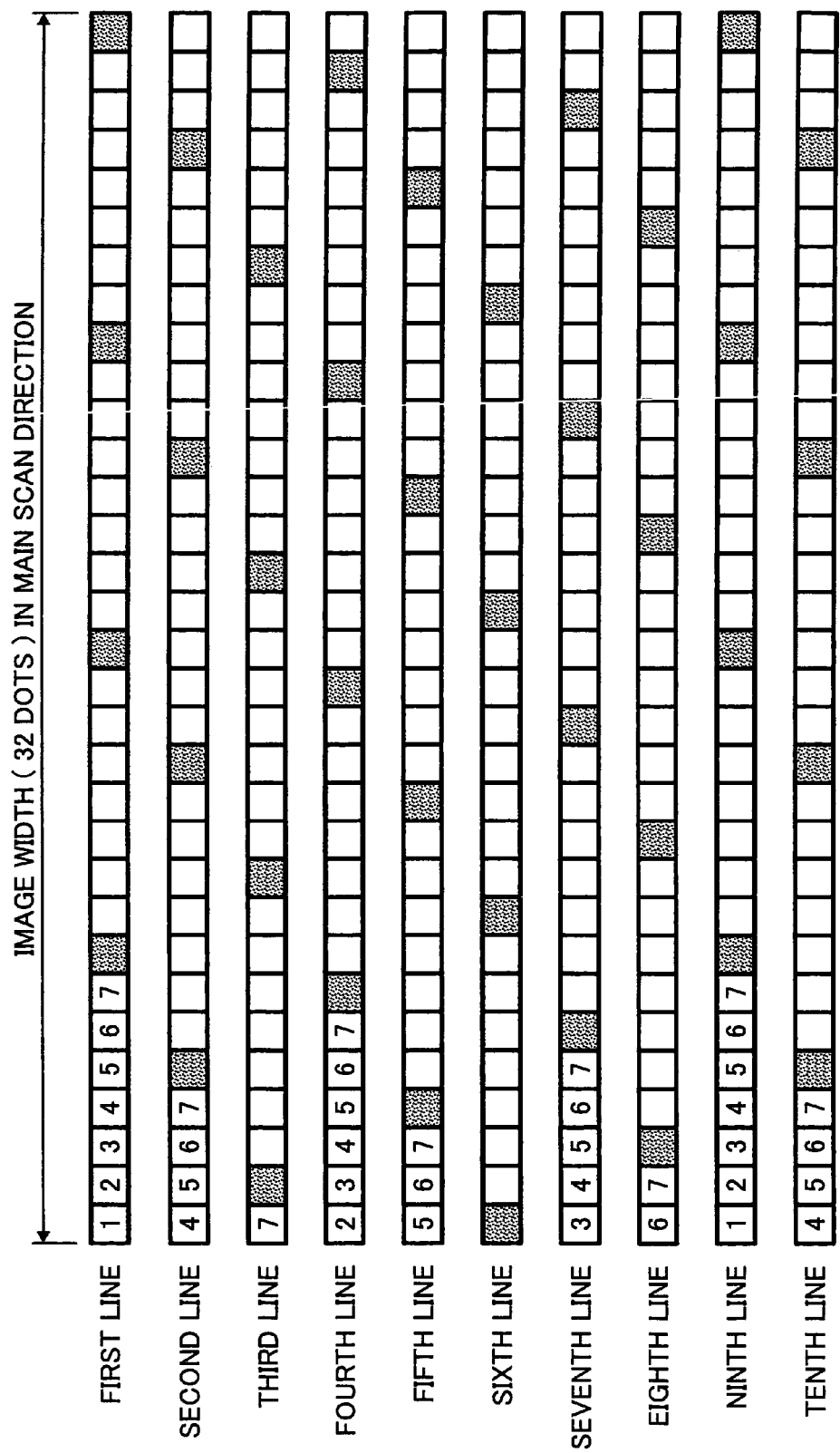
FIG. 13 depicts pixels of which phases of the pixel clock are to be shifted in a main scan direction and a sub-scan direction.

FIG. 13 depicts pixels of which phases of the pixel clock PCLK are to be shifted in the main scan direction and the sub-scan direction. Pixels of which phases are to be shifted are uniformly arranged within the image magnification correction areas E2 and E3, in a similar manner to that explained above with reference to FIG. 12. Positions of these pixels are changed in each main scan line such that the pixels of which phases are to be shifted are not located at the same positions in the sub-scan direction. It is assumed that the area width in the main scan direction is 32 dots and that four pixels of which phases are to be shifted are inserted in an eight-dot cycle. A counter that operates in the pixel clock PCLK determines the positions of the pixels of which phases are to be shifted. In a first line, the counter counts up from 1. When the counter values are 8, 16, 24, and 32, the phases of these pixels are shifted. In a second line and after, the pixel positions are changed by each three dots for each line, based on the following expression:

Change of position=cycle of pixels of which phases are to be shifted×3/7=8×3/7=3.

When the change exceeds the cycle of the pixels of which phases are to be shifted, the pixel positions are changed by the excess amount from the initial position (the first line).

Specifically, in the first line, the pixels are counted up starting from 1. However, in the second line, since the pixel positions are changed by three dots, a start value of the counter is set to 1+3=4. With this arrangement, the positions of the pixels of which phases are to be shifted are changed by three dots (advanced). In a third line, the positions are further changed by three dots. Therefore, a start value of the counter is set to 4+3=7. With this arrangement, the positions of the pixels of which phases are to be shifted are further changed by three dots (advanced). In a fourth line, a start position of the counter is calculated as 7+3=10. However, since 10 exceeds the cycle 8 of the pixels of which phases are to be shifted, the excess amount 10−8=2 is set as a start value of the counter.

As explained above, the positions of the pixels of which phases are to be shifted are changed by changing the start values of the main scan counter for each line. The expression for calculating the change is not particularly limited to this, and an expression that can calculate positions that change at random for each line is sufficient.

According to the first embodiment, the total width magnification correction is carried out based on a combination of a change of the frequency of the pixel clock PCLK and a change of the cycle (phase) of the pixel clock PCLK. Assume that pixel clock frequencies change at step of 0.01 megahertz, like 65.00 megahertz, 65.01 megahertz, 65.02 megahertz, for example. This step is determined depending on to which extent the frequency of FREF and the frequency dividing ratio N can be changed. Assume that the total width magnification correction is carried out by changing only the frequencies. When it is necessary to change the frequency to 65.061 megahertz, for example, the frequency is set to 65.06 megahertz. The frequency of 0.001 megahertz is compensated for by shifting the phase of the pixel clock PCLK in the correction area (1) E2 and the correction area (2) E2. For example, it is assumed that when the frequency of the pixel clock PCLK is 65.00 megahertz, there is a magnification error of 0.297 millimeters in the image having a width of 297 millimeters. In this case, a pixel clock frequency f' after the correction can be obtained from the following expression:

$$f'=(1+0.279/297)\times 65.00=65.061 \text{ megahertz.}$$

When the pixel clock frequency f' after the correction cannot be set to f'=65.061 megahertz, the frequency is set to 65.06 megahertz. The remaining error is compensated for by shifting the phase of the pixel clock. A correction X to be carried out by shifting the phase of the pixel clock by subtracting a correction carried out by setting the frequency to 65.06 megahertz from the original error can be calculated as follows:

$$X=0.297-((65.06-65)/65)\times 297=0.02285 \text{ millimeter.}$$

In the first embodiment, the phase can be shifted by 1/16 PCLK, that is, in the 1/16 pixel unit. Therefore, when the pixel density is 600 dots per inch, the error can be corrected in 0.00265 millimeter unit. Consequently, a correction value Y becomes as follows:

$$Y=0.02285/0.00265=8.6\approx 9.$$

A shift direction is a direction of contracting the image. Therefore, this direction is a direction for advancing the phase (shortening the cycle). The total width magnification is corrected by setting this correction data and data for correcting the frequency of the pixel clock PCLK. The phase (cycle) of the pixel clock PCLK is changed at nine positions. For example, the phase is corrected at uniformly-allocated positions, such as at five positions in the correction area (1) E2 and at four positions in the correction area (2) E3. These positions are scattered as shown in FIG. 12 and FIG. 13. The above calculation is only an example, and the calculation is not limited thereto. A correction table can be prepared in advance, and a target frequency is calculated. With this arrangement, a set value of the pixel clock frequency corresponding to the correction and a phase change can be known without calculation.

Figure 14:
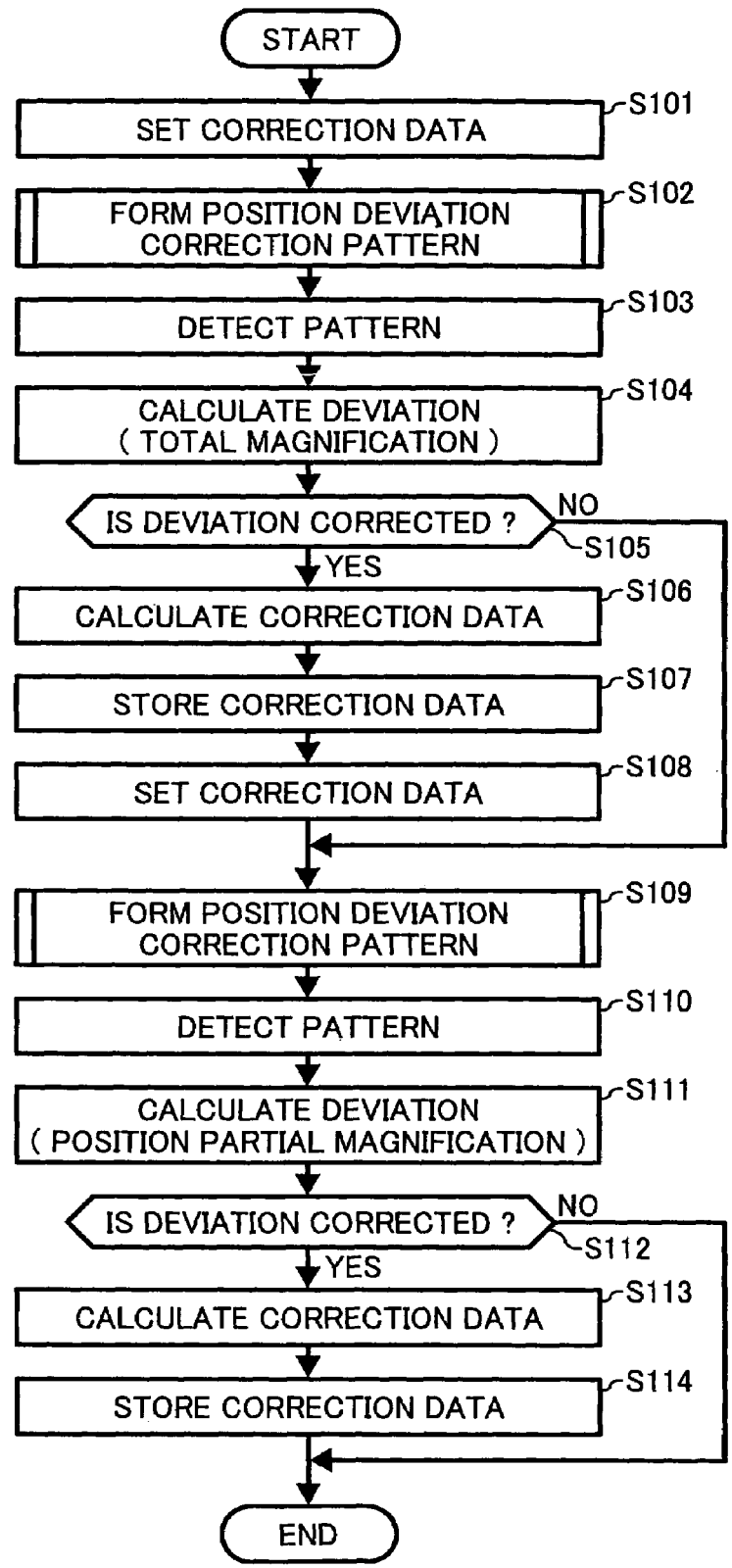
FIG. 14 is a flowchart of a processing procedure of an image position deviation correction according to the first embodiment.

FIG. 14 is a flowchart of a process procedure of the image position deviation correction according to the first embodiment. In this process procedure, correction data stored in the correction data storage unit 207 is set to each controller (step S101). The set data is the correction data determined in the last correction operation, or the initial value (a default value set in advance) when data is not corrected at all in the past. After setting the correction data, the position deviation correction patterns BK1, C1, M1, Y1, BK2, C2, M2, Y2, BK3, C3, M3, Y3, BK4, C4, M4, Y4, BK5, C5, M5, Y5, BK5, BK6, C6, M6, and Y6 that are shown in FIG. 11 are formed on the transfer belt B (step S102). The sensor 126a and the sensor 126c detect these patterns (step S103). The printer controller 201 calculates a deviation of the total width magnification of each color from black BK as described above (step S104), and determines whether the deviation is to be corrected (step S105). The printer controller 201 determines that the deviation is to be corrected when the deviation is equal to or more than a half of the correction resolution.

When the deviation is to be corrected, correction data (frequency setting data, phase shift amount, and its direction) is calculated (step S106), the correction data is stored into the correction data storage unit 207 (step S107), and the correction data is set to each controller as described above (step S108). When the deviation is not to be corrected, the correction data is not updated.

Position deviation correction patterns are formed again (step S109). The sensor 126a, the sensor 126b, and the sensor 126c detect these patterns (step S110), and the printer controller 201 calculates a deviation of each color from black BK (step S111). In this case, the printer controller 201 calculates deviations of an image position and a partial magnification, and determines whether the deviations are to be corrected (step S112). The printer controller 201 determines that the deviations are to be corrected when the deviation is equal to or more than a half of the correction resolution, in a similar manner to that for correcting the deviation of the total width magnification.

When the deviations are to be corrected, correction data is calculated (step S113), and the correction data is stored into the correction data storage unit 207 (step S114). The correction data are a set value of the XLGATE signal for determining the image position in the main scan, a phase shift of the pixel clock PCLK to be set in the image position correction area and a shift direction, phase shifts of the pixel clock PCLK to be set in the correction area (1) E2 and the correction area (2) E3 respectively and their shift directions, and a set value of the XFGATE signal for determining the image position in the sub-scan direction. When correction is not performed, the correction data are not updated.

At the time of carrying out the image formation operation and the image position deviation correction operation, the correction data stored in the correction data storage unit 207 are set to each controller.

The image position correction in the main scan direction is a combination of the correction in one-dot unit and the correction in 1/16 dot unit. The correction in the one-dot unit is carried out at the timing of the XLGATE signal. The correction in the 1/16 dot unit is carried out by changing the phase (cycle) of the pixel clock PCLK in the image position correction area E1.

In the first embodiment, the deviation of the total width magnification is calculated at step S102, and the deviations of the image position and the partial magnification are calculated at step S109. On the other hand, in a second embodiment, all corrections are carried out by forming correction patterns at one step. Only the difference from the first embodiment is explained below.

Figure 15:
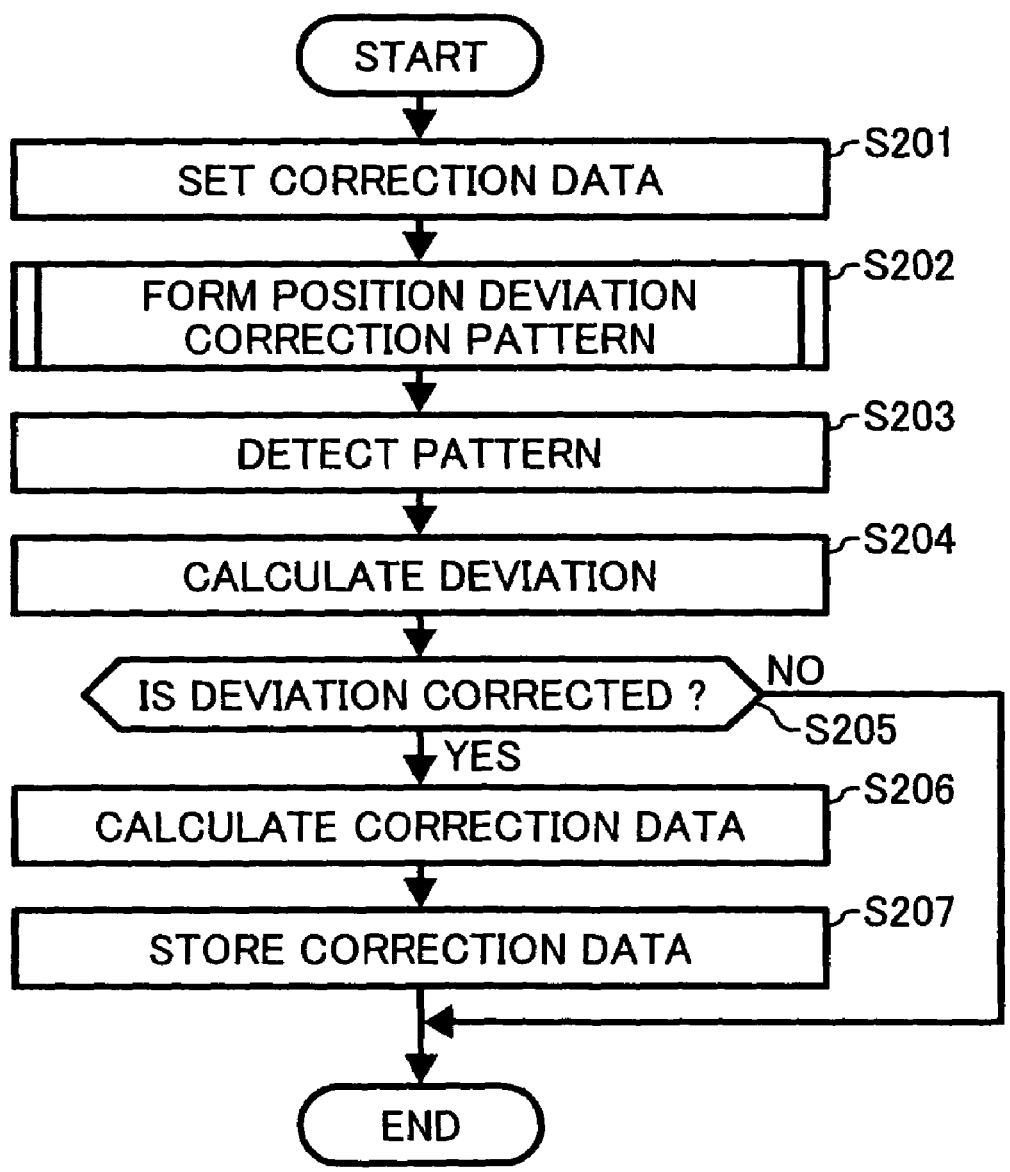
FIG. 15 is a flowchart of a processing procedure of an image position deviation correction according to a second embodiment of the present invention.

FIG. 15 is a flowchart of a process procedure of an image position deviation correction according to the second embodiment. In this process procedure, the total width magnification correction affects an image position deviation and a partial magnification deviation detected at positions of the sensors 126a to 126c. Therefore, the influence of the total width magnification correction is predicted, and this is subtracted from or added to the detected value, thereby calculating correction data for correcting the image position and the partial magnification.

For example, assume that it is necessary to change the pixel clock frequency from 65.00 megahertz to 65.061 megahertz to correct the total width magnification, based on a result of detection of the correction pattern. Furthermore, assume that a deviation detected by the sensor 126a is 0.1 millimeter and that a distance from the synchronization sensor 123 that becomes the reference of image writing to the sensor 126a is 10 millimeters. In this case, the deviation A detected by the sensor 126a after correcting the total width magnification is calculated as follows:

$$A=(65.00/65.061)\times(10+0.1)-10=0.09053 \text{ millimeters.}$$

This is similarly applied to the deviation detected by the sensor 126b and the sensor 126c. Only the distance from the synchronization sensor 123 to each of the sensors 126a to 126c changes. Therefore, in this process procedure, the process at step S201 to S203 is the same as that at step S101 to step S103 in the first embodiment, and the deviation is calculated in the similar manner (step S204). When it is necessary to correct the deviation (step S205), the total width magnification is corrected at step S206 in the same manner to that in the first embodiment. Furthermore, the detected deviation is corrected by the above calculation. The actual correction data is calculated based on the result of this correction. Similarly to the first embodiment, the image position correction in the main scan direction is the combination of a correction in one-dot unit and a correction in 1/16 dot unit. The correction in the one-dot unit is carried out at the timing of the XLGATE signal. The correction in the 1/16 dot unit is carried out by changing the phase (cycle) of the pixel clock in the image position correction area E1. The partial magnification is corrected in the 1/16 dot unit. The correction data is stored (or updated) in the correction data storage unit 207.

Other parts are configured similarly to that according to the first embodiment, and function similarly. Therefore, a redundant explanation is omitted.

In the first embodiment, the correction area (1) E2 between the sensor 126a and the sensor 126b, and the correction area (2) E3 between the sensor 126b and the sensor 126c are detected respectively. On the other hand, in a third embodiment, this correction is simplified. In other words, only the correction area (1) E2 between the sensor 126a and the sensor 126b is detected, thereby carrying out a partial magnification correction. In the third embodiment, the correction data for the correction area (1) E2 is calculated. The correction data for the correction area (2) E3 is set to a value that offsets the correction data for the correction area (1) E2. For example, when the correction data for the correction area (1) E2 is +8, the correction data for the correction area (2) E3 is set to −8. In this case, + and − signs represent a direction in which the phase is shifted, and numerical values denote numbers of pixels of which phases are to be shifted.

Other parts are configured similarly to that according to the first embodiment, and function similarly. Therefore, a redundant explanation is omitted.

According to a fourth embodiment, a magnification error detector 203 is provided in the image forming apparatus according to the first embodiment. The synchronization sensor includes two detectors of a synchronization sensor at the scan starting side and a synchronization sensor at the scan ending side. Only the difference from the first embodiment is explained below.

Figure 16:
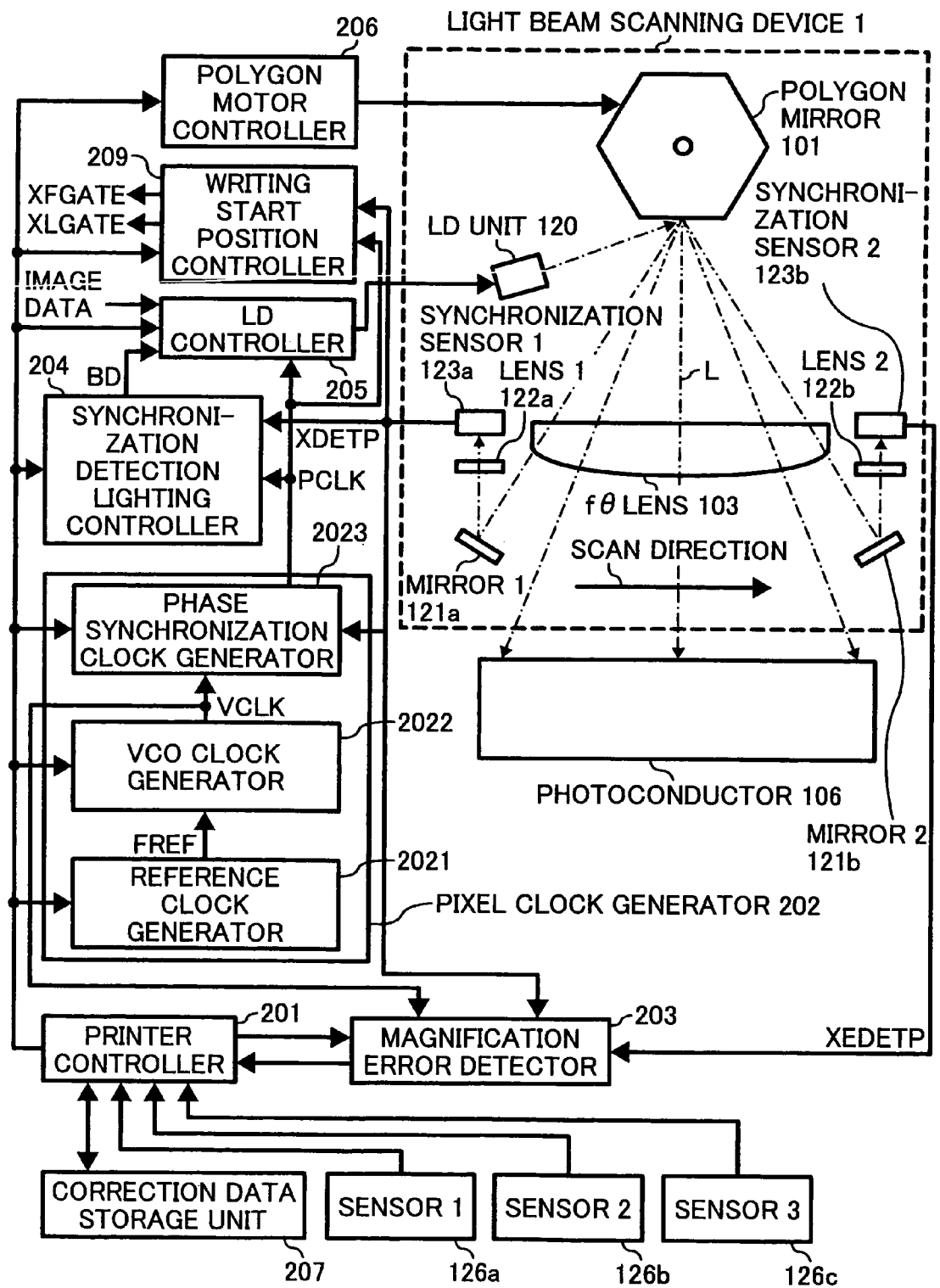
FIG. 16 is a schematic of a light beam scanning device, an image forming controller, and an optical unit according to a fourth embodiment of the present invention.

FIG. 16 is a schematic configuration diagram of a light beam scanning device, an image forming controller, and an optical unit according to the fourth embodiment. In the fourth embodiment, the two synchronization sensors of a synchronization sensor 123a and a synchronization sensor 123b that detect light beams are provided at both ends of the light beam scanning device 1 in the main scan direction, as shown in FIG. 16. A light beam L that has passed through the fθ lens 103 is reflected by a mirror (1) 121a and a mirror (2) 121b. The reflected light beams are collected by a lens (1) 122a and a lens (2) 122b, and are incident to the synchronization sensor 123a and the synchronization sensor 123b respectively. When the light beam L passes through the synchronization sensors, the synchronization sensor 123a outputs a start-side synchronization detection signal XDETP, and the synchronization sensor 123b outputs an end-side synchronization detection signal XEDETP. These synchronization detection signals are input to the magnification error detector 203.

The magnification error detector 203 measures the time from the falling edge of the start-side synchronization detection signal XDETP to the falling edge of the end-side synchronization detection signal XEDETP, and compares this time with a reference time difference. The magnification error detector 203 changes the pixel clock frequency and the cycle of the pixel clock by this difference in one-pixel unit, thereby correcting the image magnification.

Figure 17:
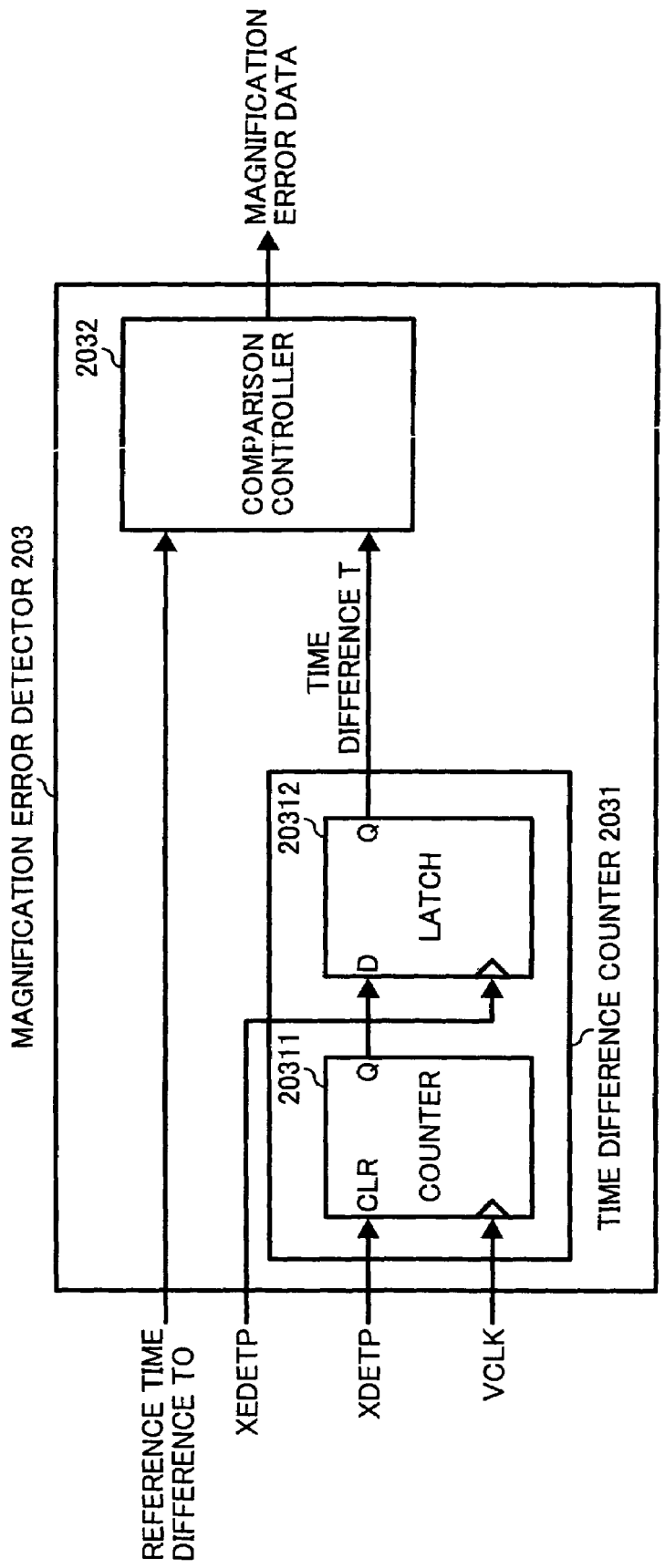
FIG. 17 is a detailed block diagram of a magnification error detector shown in FIG. 16.

FIG. 17 is a detailed block diagram of the magnification error detector 203. The magnification error detector 203 includes a time difference counter 2031 and a comparison controller 2032. The time difference counter 2031 includes a counter 20311 and a latch 20312. When the measuring of a time difference between two points (between the start-side synchronization sensor 123a and the end-side synchronization sensor 123b) is started, the counter is cleared based on the start-side synchronization detection signal XDETP. The clock VCLK counts up, and the latch 2031 latches the count value at the falling edge of the end-side synchronization detection signal XEDETP. The comparison controller 2032 compares the count value of a time difference T with the reference count value of a time difference T0 that is set in advance, thereby obtaining difference data (magnification error data), and transmits the difference data to the printer controller 201. The printer controller 201 changes the frequency of the pixel clock PCLK and the cycle of the clock (shifts the phase), based on the magnification error data, thereby calculating the number of pixels and their direction (whether to be advanced or delayed).

Regarding the reference time difference T0, a time difference in the state that the magnification is matched (there is no magnification error) is measured and stored in advance. When a frequency before the correction is expressed as fo, a frequency f' after the correction is obtained as follows:

$$f'=fo \times T0/T$$

For example, assume that the variable step of the pixel clock PCLK is 0.1 megahertz and that the reference count value (the reference time difference T0) from the start-side synchronization detection signal XDETP to the end-side synchronization detection signal XEDETP when PCLK=65 megahertz is 20000, and the correction is carried out. Assume that a measured value is 20037 in this case. Since the image is contracted, it is necessary to delay the pixel clock frequency or delay the phase of the pixel clock. When the correction is carried out by changing only the pixel clock frequency, a frequency after the correction becomes as follows:

Frequency after correction=65 megahertz×(20000/20037)=64.88 megahertz.

Since the variable step is 0.1 megahertz, the frequency change becomes 64.9 megahertz or 64.8 megahertz. When the frequency change is the nearest 64.9 megahertz, 0.02 megahertz is corrected by shifting the phase. When the frequency change is 64.9 megahertz, the count value becomes as follows:

65 megahertz×20000/64.9 megahertz=20031.

Therefore, the phase is delayed by

20037−20031=6 VCLK.

In other words, the phase is delayed by 1/16 PCLK×12.

Figure 18:
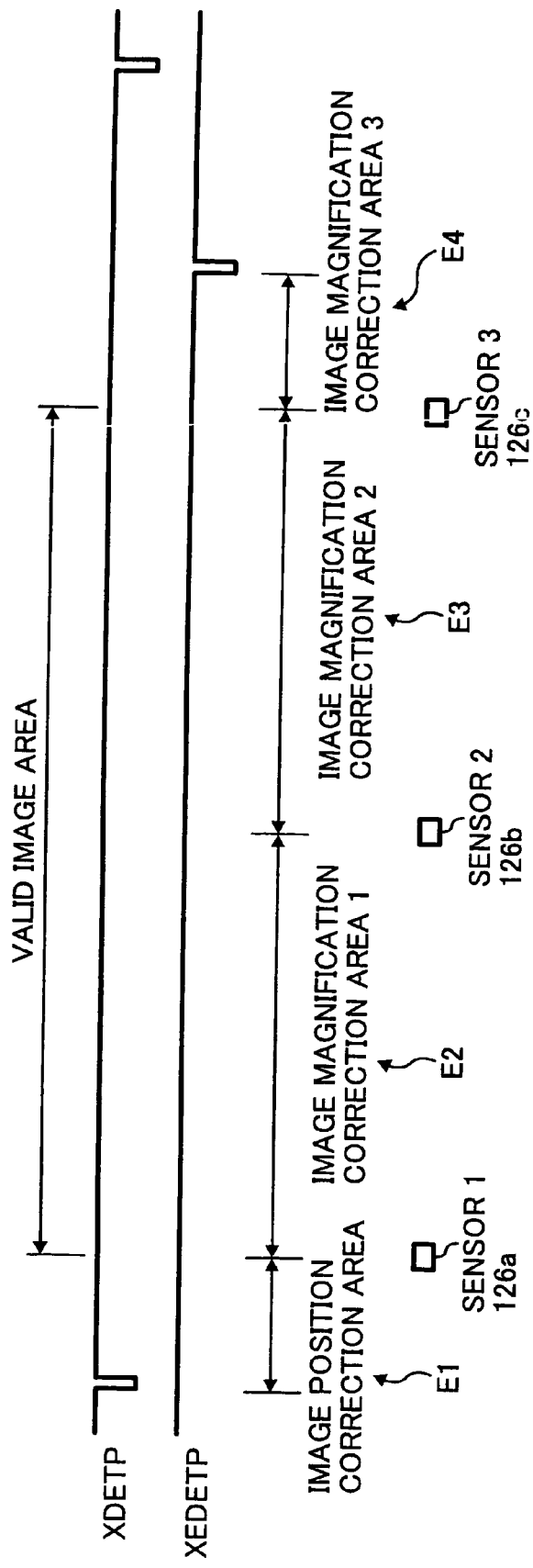
FIG. 18 is a schematic for explaining a sensor position and an area to be corrected according to the fourth embodiment.

FIG. 18 depicts a sensor position and an area to be corrected. In the fourth embodiment, since the synchronization sensor 123*b* is set at the scan ending side, the correction area (3) E4 is between the synchronization sensor 123*c* and the synchronization sensor 123*b*.

Figure 19:
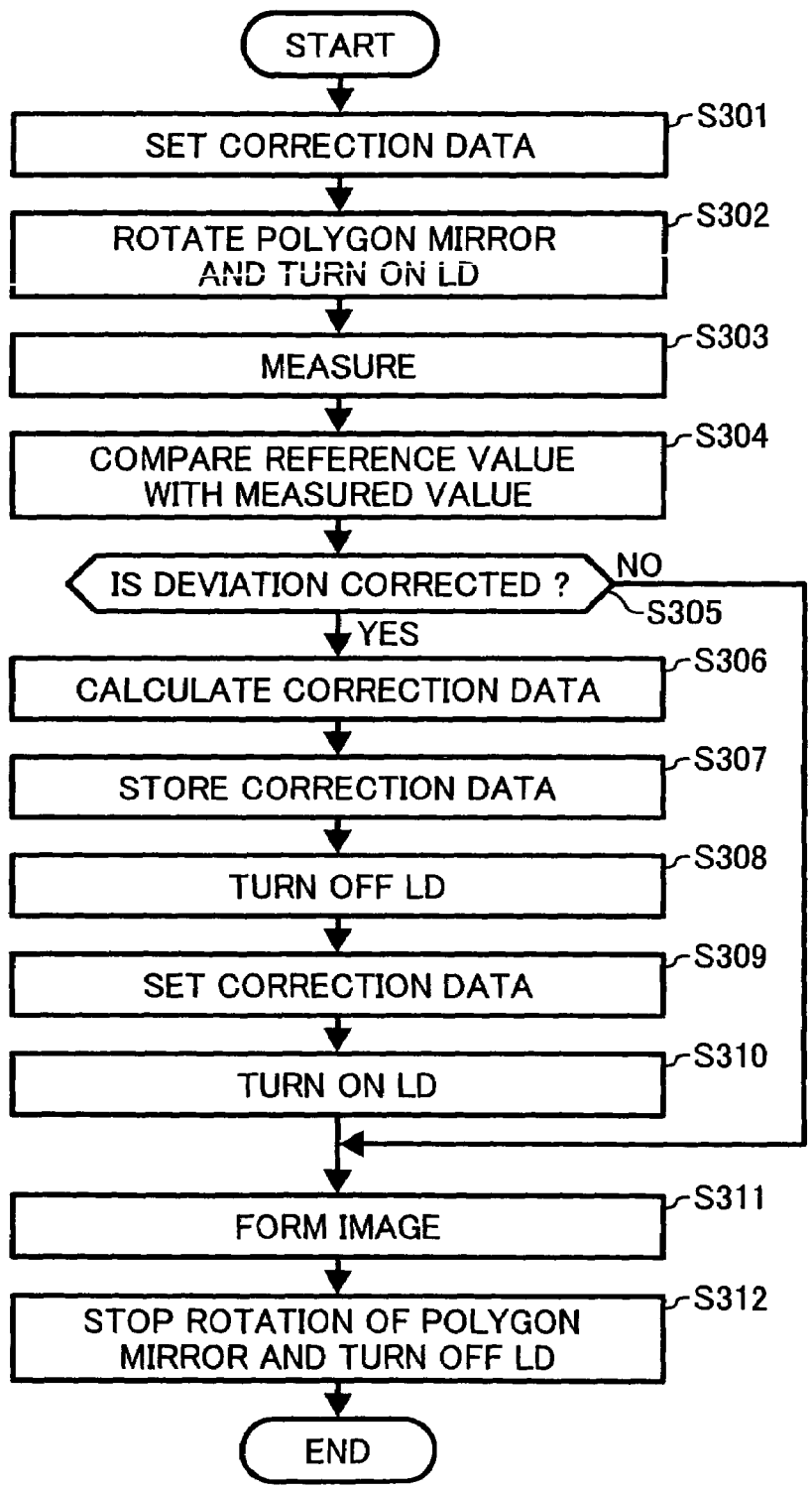
FIG. 19 is a flowchart of a processing procedure of an image magnification correction according to the fourth embodiment.

FIG. 19 is a flowchart of a process procedure of an image magnification correction according to the fourth embodiment. First, correction data stored in the correction data storage unit 207 is set to each controller (step S301). The set data is the correction data determined in the last correction operation, or the initial value (a default value set in advance) when data is not corrected at all in the past. After setting the correction data, the polygon mirror 101 is rotated, and the LD is turned on (step S302), thereby starting a measuring between two points (step S303). The stored reference count value is compared with the measured value (step S304), and it is determined whether correction is necessary (step S305). This determination is made based on the magnification correction resolution (correction precision). When an error equal to or more than a half of the correction resolution is detected, the correction is carried out. In carrying out the correction, the correction data (the frequency set data, the phase shift, and its direction) are calculated (step S306). The correction data are stored into the correction data storage unit (step S307). The LD is turned off once (step S308), and the correction data are set to the pixel clock generator 202 (step S309). Thereafter, the LD is turned on again (step S310), thereby starting the image formation operation (image writing operation) (step S311). When correction is not carried out, the image formation operation is started without changing the setting of the pixel clock (steps S305 to S311). After ending the image formation operation, the LD is turned off, the rotation of the polygon mirror 101 is stopped (step S312), and the operation ends.

In the fourth embodiment, while the image magnification is corrected before the printing, the process is not limited to this. Alternatively, a measuring can be carried out between two points between pages, for example, thereby executing the correction during the printing.

In the flowchart of the image position deviation correction process explained in the first embodiment, the cycle of the pixel clock PCLK is changed in the image position correction area E1, the image magnification correction area (1) E2, and the image magnification correction area (2) E3, to correct the image position and the partial magnification. On the other hand, in the fourth embodiment, data that offsets the addition of the correction data in the areas E1 to E3 is set in the image magnification correction area (3) E4. For example, when the correction data +5 (delaying the phases of five pixels) is set in the image position correction area E1, when the correction data +10 (delaying the phases of ten pixels) is set in the image magnification correction area (1) E2, and when the correction data −10 (advancing the phases of ten pixels) is set in the image magnification correction area (2) E3, −(+5+10−10)= −5 is set in the image magnification correction area (3) E4. The correction data is set at the start of the flowchart (step S301) in FIG. 19.

Other parts that are not particularly explained are configured similarly to that according to the first embodiment, and function similarly.

According to the above embodiments, following effects can be obtained:

1. An image position and an image magnification can be corrected in high precision without deteriorating the image quality.
2. An image position and an image magnification can be easily corrected in high precision.
3. An image position in a main scan direction and an image magnification can be corrected simultaneously in a minimum correction operation of an image position deviation.
4. A detection of an image position and its process can be simplified.
5. A magnification correction can be carried out based on a measuring between two points without the influence of correction of an image position and an image magnification in the image position deviation correction operation.

According to the embodiments, an image writing error and an image magnification error can be corrected in high precision. As a result, an image position and an image magnification can be corrected in high precision without deteriorating the image quality.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
a plurality of image forming units, each of which forms an image of one color and a correction pattern to be used for correcting position deviation of the image, wherein each image forming unit forms the image on an image formed by another image forming unit to form a color image;
a plurality of detectors, each of which detects the correction pattern formed by a corresponding one of the image forming units, the detectors including a first detector that is positioned at an image writing starting side, a second detector, and a third detector, the second detector positioned between the first and third detectors;
a printer controller that controls only the first and third detectors to detect respective first formed correction patterns, and that corrects a total-width magnification error in the main scan direction based on results of detections by only the first detector and the third detector; and
the printer controller further controls each of the first detector, second detector, and third detector to detect respective second formed correction patterns, and corrects a deviation of an image writing position in a main scan direction and corrects partial magnification errors based on a result of detection by the first detector, the second detector, and the third detector.

2. The image forming apparatus according to claim 1, further comprising a light source, wherein
the printer controller further changes a cycle of a lighting control clock of the light source by one-pixel unit in correcting the total-width magnification error.

3. The image forming apparatus according to claim 2, wherein the change by one-pixel unit is carried out at a plurality of positions.

4. The image forming apparatus according to claim 1, wherein
the printer controller further variably controls, at least at one position, a cycle of a pixel clock at the image writing starting side of the first detector.

5. The image forming apparatus according to claim 1, wherein
the printer controller further changes a pixel clock frequency, and the printer controller further corrects the image writing position according to a change of the image writing position caused by the change of the pixel clock frequency.

6. The image forming apparatus according to claim 1, wherein a valid image area includes a first area and a second area, and the printer controller further sets correction values for first area and second area such that the correction values offset each other.

7. The image forming apparatus according to claim 6, wherein the detectors further include a fourth detector that is positioned at substantially a center of the valid image area, and a first-end-detector that is positioned at a first end of the valid image area, and the printer controller sets a first correction value for the valid image area between the fourth detector and the first-end-detector based on results of detections by the fourth detector and the first-end-detector, and a second correction value, which is set so as to offset the first correction value, for remaining portion of the valid image area.

8. The image forming apparatus according to claim 6, further comprising a light beam detector that detects a light beam at a scan ending side, wherein the printer controller further changes a cycle of a pixel clock, and image forming apparatus further comprising a cycle changing unit that changes a cycle of a pixel clock by one-pixel unit in an area from a valid image writing end position to the light beam detector so as to offset the change of the cycle of the pixel clock changed by the first correcting unit and the fourth correcting unit.

9. The image forming apparatus according to claim 1, wherein each of the image forming units first forms a latent image by irradiating a light beam in accordance with corresponding image data onto an image carrier, the image carrier being any one of rotatable and movable, and the image forming apparatus further includes a developing unit that develops latent images formed by the image forming units to form developed images; and a transferring unit that transfers the developed images onto a recording medium thereby forming the color image.

10. The image forming apparatus according to claim 1, wherein each of the image forming units forms a latent image by irradiating a light beam in accordance with corresponding image data onto an image carrier, the image carrier being any one of rotatable and movable, and the image forming apparatus further includes a developing unit that develops latent images formed by the image forming units to form developed images;

a first transferring unit that transfers the developed images onto a transfer medium; and a second transferring unit that transfers the developed image from the transfer medium onto a recording medium thereby forming the color image.

11. The image forming apparatus according to claim 1, wherein the image forming apparatus corrects a deviation of an image writing position and an image magnification error for each color.

12. The image forming apparatus according to claim 1, wherein the respective second formed correction patterns are formed after the respective first formed correction patterns.

* * * * *